(12) United States Patent
Saxena et al.

(10) Patent No.: US 8,697,829 B2
(45) Date of Patent: Apr. 15, 2014

(54) PROCESS FOR THE MANUFACTURE OF SILICONE IONOMER

(75) Inventors: Anubhav Saxena, Bangalore (IN); Alok Sarkar, Malda (IN)

(73) Assignee: Momentive Performance Materials Inc., Waterford, NY (US)

( * ) Notice: Subject to any disclaimer, the term of this patent is extended or adjusted under 35 U.S.C. 154(b) by 12 days.

(21) Appl. No.: 13/343,178

(22) Filed: Jan. 4, 2012

(65) Prior Publication Data

US 2013/0172510 A1 Jul. 4, 2013

(51) Int. Cl.
| | |
|---|---|
| C08G 77/10 | (2006.01) |
| C08G 77/28 | (2006.01) |
| C08G 77/392 | (2006.01) |
| C08F 283/12 | (2006.01) |
| H01B 1/12 | (2006.01) |
| H01M 6/18 | (2006.01) |

(52) U.S. Cl.
USPC ............................... 528/30; 528/43; 525/479

(58) Field of Classification Search
USPC ....................................... 525/479; 528/30, 43
See application file for complete search history.

(56) References Cited

U.S. PATENT DOCUMENTS

| | | | |
|---|---|---|---|
| 2,968,643 A | 1/1961 | Bailey | |
| 4,222,952 A * | 9/1980 | Vick | 556/462 |
| 4,523,002 A | 6/1985 | Campbell et al. | |
| 4,525,567 A | 6/1985 | Campbell et al. | |
| 2007/0196713 A1 * | 8/2007 | Mah et al. | 429/33 |
| 2011/0098370 A1 * | 4/2011 | Easton et al. | 521/27 |

FOREIGN PATENT DOCUMENTS

| | | | |
|---|---|---|---|
| EP | 0 581 296 A3 | 2/1994 | |
| EP | 0581296 A2 * | 2/1994 | |
| JP | 6 025420 A | 2/1994 | |
| JP | 06025420 A * | 2/1994 | ........... C08G 77/392 |
| JP | 6247827 A | 9/1994 | |
| JP | 06247835 A * | 9/1994 | |
| JP | 6247835 A | 9/1994 | |
| WO | WO2006/065467 A2 | 6/2006 | |

OTHER PUBLICATIONS

Database WPI Week 199409, Thomson Scientific, London, GB; An 1994-072023; XP002694697.
International Search Report and Written Opinion dated Apr. 10, 2013.

* cited by examiner

*Primary Examiner* — Randy Gulakowski
*Assistant Examiner* — Christopher M Rodd
(74) *Attorney, Agent, or Firm* — Dominick G. Vicari

(57) ABSTRACT

A process for the manufacture of polyorganosiloxanes having ionic groups and reactive functional groups includes (a) conversion of a low molecular weight aralkylene modified polysiloxane to a corresponding sulfonic acid functional material by treating the low molecular weight aralkylene modified polysiloxane with a sulfonating agent; (b) subjecting the reaction product obtained in step (a) to an equilibration reaction with an acid catalyzed ring opening polymerization-effective polyorganosiloxane; and (c) subjecting the reaction product obtained in step (b) to a hydrosilylation reaction with an unsaturated hydrocarbon containing at least one epoxy group, an unsaturated hydrocarbon containing at least two unsaturation moieties, an unsaturated hydrocarbon containing at least one sulfur heteroatom, an unsaturated hydrocarbon containing a monovalent organosilane group, an unsaturated hydrocarbon containing one hydroxyl containing group, an unsaturated hydrocarbon containing one or more of a halogen, carboxylate, imine, isocyanate, amide, nitrile or tertiary amine with other than alkyl groups moiety.

38 Claims, No Drawings

PROCESS FOR THE MANUFACTURE OF SILICONE IONOMER

The present invention relates to a new process for the manufacture of polyorganosiloxanes comprising ionic groups and/or reactive functional groups.

BACKGROUND OF THE INVENTION

Silicone ionomers are siloxane polymers containing ionic groups. Siloxane polymers bearing ionic groups have been prepared but there exists demands in the marketplace for further methods of making siloxane polymers which provide for even further uses in various applications.

SUMMARY OF THE INVENTION

One objective of the present invention is directed to a process for the manufacture of functional polyorganosiloxanes comprising ionic groups. The process comprises
(a) conversion of a low molecular weight aralkylene modified polysiloxane to a corresponding sulfonic acid functional material by treating the low molecular weight aralkylene modified polysiloxane with a sulfonating agent;
(b) subjecting the reaction product obtained in step (a) to an equilibration reaction with an acid catalyzed ring opening polymerization-effective polyorganosiloxane; and, optionally,
(c) subjecting the reaction product obtained in step (b) to a hydrosilylation reaction with an unsaturated hydrocarbon containing at least one epoxy group, an unsaturated hydrocarbon containing at least two unsaturation moieties, an unsaturated hydrocarbon containing at least one sulfur heteroatom, at least one nitrogen heteroatom, an unsaturated hydrocarbon containing a monovalent organosilane group, an unsaturated hydrocarbon containing one hydroxyl containing group, an unsaturated hydrocarbon containing one or more of a halogen, carboxylate, imine, isocyanate, amide, nitrile or tertiary amine with other than alkyl groups moiety, and optionally
(d) Subjecting the epoxide-containing reaction product of (c) to a ring opening reaction preferentially in presence of a suitable catalyst with a hydroxyl, amine, carboxylic acid and thiol containing hydrocarbons, azide containing molecules or water.

The present invention is further described in the detailed description section provided below.

DETAILED DESCRIPTION OF THE INVENTION

The inventors herein have discovered a novel process of making functional silicone ionomer polyorganosiloxane containing ionic groups.

The silicone ionomers prepared by the process of this invention can undergo various physico-chemical transformations to produce materials in the form of elastomer, copolymer, gels and emulsion making them very useful in many different applications including personal care, health care, automotive, household, paints, coatings, laundry detergent, textile treatment, apparel, sportswear, oil and gas, fuel cell, electronic application, agriculture, membranes, adhesives, sealants, injection moldable and compression moldable rubbers and plastics, and various silicone based rubbers.

Selected silicone functional groups, other than the zwitterion containing functional groups, can be alkoxy, unsaturated monovalent radicals, radicals containing epoxy groups, radicals containing sulfur atom(s), radicals containing nitrogen atom(s), radicals containing organosilane groups, radicals containing hydroxyl containing group, radicals containing one or more of a halogen moiety, carboxylate moiety, imine moiety, isocyanate moiety, amide moiety, nitrile moiety or a tertiary amine moiety that contains groups other than alkyl groups.

In the specification and claims herein, the following terms and expressions are to be understood as indicated.

As used in the specification and including the appended claims, the singular forms "a," "an," and "the" include the plural, and reference to a particular numerical value includes at least that particular value, unless the context clearly dictates otherwise.

Ranges expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

All methods described herein may be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

As used herein, "comprising," "including," "containing," "characterized by," and grammatical equivalents thereof are inclusive or open-ended terms that do not exclude additional, unrecited elements or method steps, but will also be understood to include the more restrictive terms "consisting of" and "consisting essentially of."

Other than in the working examples or where otherwise indicated, all numbers expressing amounts of materials, reaction conditions, time durations, quantified properties of materials, and so forth, stated in the specification and claims are to be understood as being modified in all instances by the term "about."

It will be understood that any numerical range recited herein includes all sub-ranges within that range and any combination of the various endpoints of such ranges or sub-ranges.

It will be further understood that any compound, material or substance which is expressly or implicitly disclosed in the specification and/or recited in a claim as belonging to a group of structurally, compositionally and/or functionally related compounds, materials or substances includes individual representatives of the group and all combinations thereof.

The expression "aliphatic hydrocarbon" means any hydrocarbon group from which one or more hydrogen atoms has been removed and is inclusive of alkyl, alkenyl, alkynyl, cyclic alkyl, cyclic alkenyl, cyclic alkynyl, aryl, aralkyl and arenyl and may contain heteroatoms.

The term "alkyl" means any monovalent, saturated straight, branched or cyclic hydrocarbon group; the term "alkenyl" means any monovalent straight, branched, or cyclic hydrocarbon group containing one or more carbon-carbon double bonds where the site of attachment of the group can be either at a carbon-carbon double bond or elsewhere therein; and, the term "alkynyl" means any monovalent straight, branched, or cyclic hydrocarbon group containing one or more carbon-carbon triple bonds and, optionally, one or more carbon-carbon double bonds, where the site of attachment of the group can be either at a carbon-carbon triple bond, a carbon-carbon double bond or elsewhere therein. Examples of alkyls include methyl, ethyl, propyl and isobutyl. Examples of alkenyls include vinyl, propenyl, allyl, methallyl, ethylidenyl norbornane, ethylidene norbornyl, ethylidenyl norbornene and ethylidene norbornenyl. Examples of alkynyls include acetylenyl, propargyl and methylacetylenyl.

The expressions "cyclic alkyl", "cyclic alkenyl", and "cyclic alkynyl" include bicyclic, tricyclic and higher cyclic structures as well as the aforementioned cyclic structures further substituted with alkyl, alkenyl, and/or alkynyl groups. Representative examples include norbornyl, norbornenyl, ethylnorbornyl, ethylnorbornenyl, cyclohexyl, ethylcyclohexyl, ethylcyclohexenyl, cyclohexylcyclohexyl and cyclododecatrienyl.

The term "aryl" means any monovalent aromatic hydrocarbon group; the term "aralkyl" means any alkyl group (as defined herein) in which one or more hydrogen atoms have been substituted by the same number of like and/or different aryl (as defined herein) groups; and, the term "arenyl" means any aryl group (as defined herein) in which one or more hydrogen atoms have been substituted by the same number of like and/or different alkyl groups (as defined herein). Examples of aryls include phenyl and naphthalenyl. Examples of aralkyls include benzyl and phenethyl. Examples of arenyls include tolyl and xylyl.

It will be understood herein that all measures of viscosity are obtained at 25 degrees Celsius unless noted otherwise.

Reference is made to substances, components, or ingredients in existence at the time just before first contacted, formed in situ, blended, or mixed with one or more other substances, components, or ingredients in accordance with the present disclosure. A substance, component or ingredient identified as a reaction product, resulting mixture, or the like may gain an identity, property, or character through a chemical reaction or transformation during the course of contacting, in situ formation, blending, or mixing operation if conducted in accordance with this disclosure with the application of common sense and the ordinary skill of one in the relevant art (e.g., chemist). The transformation of chemical reactants or starting materials to chemical products or final materials is a continually evolving process, independent of the speed at which it occurs. Accordingly, as such a transformative process is in progress there may be a mix of starting and final materials, as well as intermediate species that may be, depending on their kinetic lifetime, easy or difficult to detect with current analytical techniques known to those of ordinary skill in the art.

In one embodiment herein the low molecular weight aralkylene modified polysiloxane subjected to the sulfonation reaction in step (a) is at least one of the formulae (Ia) to (Ic):

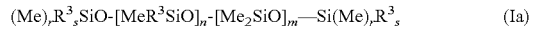
(Ia)

wherein Me is $CH_3$, $R^3$ is —$CH_2$—$CH(R^1)(CH_2)_kC_6H_5$, or —$CH_2CH(R')(CH_2)_kC_6H_4(CHR^2)_kCH_3$ where R', $R^2$ is hydrogen or an aliphatic, aromatic or fluoro containing monovalent hydrocarbon radical containing from 1 to about 60 carbon atoms, specifically from 1 to about 20 carbon atoms, more specifically from 1 to about 8 carbon atoms, l has a value of 0 to 20, specifically from 0 to about 8 and k has a value of 0 to 10, specifically 0 to about 5, r is 2 or 3, s is 0 or 1, n is 0 to 150, specifically, 0 to 20, s+n is greater than 0, and m is 0 to 400, specifically 0 to about 10; and the siloxy units may have a random or blockwise distribution;

(Ib)

wherein Me and $R^3$ have the same meaning as above and p=3 to 10; and $R^3_sT_sQ$ (Ic)

Wherein $R^3$, T and Q have the same meaning as described above.

In one other embodiment of the present invention, the sulfonating agent is selected from the group consisting of chlorosulfonic acid, sulfuric acid, liquid $SO_3$, gaseous $SO_3$, $SO_3$ containing gases, oleum, and $SO_3$ complexes or mixtures thereof.

In yet another embodiment of the present invention, the reaction of step (a) can be conducted at a temperature of from 0 degrees Celsius to about 180 degrees Celsius, specifically about 5 degrees Celsius to about 50 degrees Celsisus, and at a pressure between about 0.001 to about 100 bar, specifically at normal pressure of about 1030 mbar. The amount of sulfonating agent is present in an amount of from about 0.1 to about 10.0 equivalents with respect to the arylalkylene groups present in the low molecular weight aralkylene modified polysiloxane.

In another embodiment of the present invention, the process described herein can further optionally comprise wherein the reaction product obtained in step (a) is neutralized in the presence of a solvent at a temperature of from −25 degrees Celsius to about 180 degrees Celsius, specifically from 5 to about 50 degrees Celsius, and at a pressure between 0.001 to 100 bar, specifically at normal pressure of about 1030 mbar.

In one embodiment herein the solvent is a base selected from the group consisting of hydroxides, ammonia, carbonates, bicarbonates and organic amines. The hydroxide can be selected from the group consisting of sodium hydroxide, potassium hydroxide, lithium hydroxide, calcium hydroxide, aluminum hydroxide and ammonium hydroxide. The carbonate can be selected from the group consisting of sodium carbonate, potassium carbonate, lithium carbonate, and ammonium carbonate. The bicarbonate is selected from the group consisting of sodium bicarbonate, potassium bicarbonate, lithium bicarbonate and ammonium bicarbonate. The organic amine can be selected from the group consisting of ethanolamine, diethanolamine, triethanolamine, diethyl amine, dimethyl amine, trimethyl amine, triethyl amine and tributyl amine.

In one embodiment, the reaction product of step (a) of the process described herein has one of the general formulae (IIa), (IIb) or (IIc):

(IIa)

wherein Me is $CH_3$, $R^4$ is a monovalent radical bearing ionic group and having the formula -A-$SO_3$M where A is a divalent arylalkylene group selected from divalent aralkylene group selected from the group consisting of —$(CHR')_kC_6H_4(CH_2)_l$—, —$CH_2CH(R')(CH_2)_kC_6H_4$—, and —$CH_2CH(R')(CH_2)_lC_6H_3R''$— where R' is hydrogen or an aliphatic, aromatic or fluoro containing monovalent hydrocarbon radical containing from 1 to about 60 carbon atoms, specifically from about 1 to about 20 carbon atoms, more specifically from about 1 to about 8 carbon atoms, l has a value of 0 to 20, specifically from about 0 to about 8, k has a value of 0 to 10, specifically from about 0 to about 5, M is hydrogen or a cation independently selected from alkali metals, alkali earth metals, transition metals, metals, metal complexes and quaternary ammonium groups, organic cations, alkyl cations, cationic hydrocarbons and cationic biopolymers, m is 0 to 400, specifically from about 0 to about 10, n is 1 to 50, specifically from about 0 to about 10, r is 2 or 3, s is 0 or 1 and s+n is greater than 0; —(CH$_2$)$_l$C$_6$H$_4$(CH$_2$)$_k$—, —CH$_2$CH(CH$_3$) (CH$_2$)$_k$C$_6$H$_4$—, and —CH$_2$CH(R')(CH$_2$)$_l$C$_6$H$_3$R"—, where R' is as defined above, R" is a monovalent radical specifically from about 1 to about 20 carbon atoms, more specifically from about 1 to about 8 carbon atoms, sulfur atom(s), nitrogen atom(s), oxygen atom(s) or a radical containing combinations of the above atoms, where R$^4$, r and s are as defined above, and the siloxy units have a random or blockwise distribution;

$$[MeR^4SiO]_p \tag{IIb}$$

wherein Me and R$^4$ are as defined above, and p=3 to 10; and $$R^4{}_sT_sQ \tag{IIc}$$

wherein T and Q have the same meaning as described above.

In one embodiment of the present invention, M in the definition of R4 is a cation independently selected from but not limited to Li, Na, K, Cs, Mg, Ca, Ba, Zn, Cu, Fe, Ni, Ga, Al, Mn, Cr, Ag, Au, Pt, Pd, Pb, Ru, Sb, Sn and Rh as well as their multivalent forms In another embodiment of the present invention, the monovalent hydrocarbon radical of R$^1$, R$^2$, R$^3$, R$^5$, R$^6$, R$^8$, R$^9$, R$^{10}$, R$^{11}$, R$^{13}$, R$^{15}$, R$^{16}$ is independently selected from the group consisting of methyl, ethyl, n-propyl, iso-propyl, n-butyl, isobutyl, tert-butyl, n-pentyl, iso-pentyl, neopentyl, tert-pentyl, hexyl, heptyl, octyl, isooctyl, 2,2,4-trimethylpentyl, nonyl, decyl, cycloalkyl radicals, such as cyclopentyl, cyclohexyl, cycloheptyl and methylcyclohexyl, and aryl groups such as phenyl, naphthyl; o-, m- and p-tolyl, xylyl, ethylphenyl, and benzyl.

In one other embodiment herein the divalent hydrocarbon group of A in formula (II) is an arylene group selected from the group consisting of —(CH$_2$)$_k$C$_6$H$_4$— —CH$_2$CH(R') (CH$_2$)$_k$C$_6$H$_4$—, —(CH$_2$)$_k$C$_6$H$_4$(CH$_2$)$_l$— and —CH$_2$CH(R') (CH$_2$)$_l$C$_6$H$_3$R'''— where l has a value of 1 to 20, specifically from 1 to about 10 and k has a value of 0 to 20, specifically from 0 to about 10.

In another embodiment, the divalent hydrocarbon group of A in formula (II) is an alkylene group of the formula —(CHR$^{19}$)$_m$— where m has a value of 1 to 20, specifically, from 1 to about 10 and R$^{19}$ is hydrogen or R$^1$.

In yet another embodiment, the divalent hydrocarbon group of A in formula (II) is selected from the group consisting of —CH$_2$—, —CH$_2$CH$_2$—, —CH$_2$CH(CH$_3$)—, —CH$_2$CH(CH$_3$)CH$_2$—, and —CH$_2$CH$_2$CH(CH$_2$CH$_3$) CH$_2$CH$_2$CH$_2$—.

In another embodiment the divalent hydrocarbonoxy group of A in formula (II) is —(CHR$^{19}$)$_m$—(O— CHR$^{19}$CH$_2$)$_{m'}$—O—(CH$_2$)$_l$— where R$^{19}$ is independently hydrogen or R1 where l has a value of from 0 to 20, specifically from 1 to about 10, m has a value of 0 to 50 and m' has the value from 1 to 50.

In one other embodiment, M can be a cation independently selected from but not limited to Li, Na, K, Cs, Mg, Ca, Ba, Zn, Cu, Fe, Ni, Ga, Al, Mn, Cr, Ag, Au, Pt, Pd, Ru, Pb, Sn, Sb and Rh as well as their multivalent forms.

In one embodiment of the present invention, the equilibration reaction of step (b) of the process described herein is conducted optionally with an equilibration catalyst at a temperature of between 0 degrees Celsius to about 120 degrees Celsius, specifically from about 20 to about 70 degrees Celsius, and at a pressure of from about 0.001 to about 100 bar, specifically from about 0.1 to about 10 bar. The equilibration catalyst used in step (b) can be any known equilibration catalysts, but specifically, the equilibration catalyst can be selected from the group consisting of sulfuric acid, acid modified clay, acid modified resins, triflic acid, potassium hydroxide, sodium hydroxide, tetramethylammonium siloxanolate and potassium siloxanolate. The amount of equilibration catalyst in step (b) is generally in the range of from about 0.1 to about 10 weight percent with respect to the total weight of the reaction mixture.

In yet another embodiment of the present invention, the equilibration reaction of step (b) is conducted with the reaction product of step (a) and one or more of a linear, branched or cyclic polyorganosiloxane.

Specifically the polyorganosiloxane of step (b) can be at least one of the general formulae (IIIa) and (IIIb):

$$R^5R^6R^7SiO(R^8R^9SiO)_vSiR^{10}R^{11}R^{12} \tag{IIIa}$$

where R$^5$, R$^6$, R$^7$, R$^8$, R$^9$, R$^{10}$, R$^{11}$, R$^{12}$, R$^{13}$, R$^{14}$ are independently selected from hydride, methyl or a vinyl group and v=1 to 4000, specifically from 1 to about 800;

$$(R^{13}R^{14}SiO)_w \tag{IIIb}$$

where R$^{13}$ and R$^{14}$ are as defined and w=3 to about 10.

Specifically the cyclic polyorganosiloxanes of formula (IIIb) can be those selected from the group consisting of hexamethylcyclotrisiloxane, octamethylcyclotetrasiloxane, tetramethylcyclotetrasiloxane, decamethylcyclopentasiloxane, tetravinylcyclotetrasiloxane, and mixtures thereof, specifically octamethylcyclotetrasiloxane, and tetramethylcyclotetrasiloxane.

In another embodiment of the present invention, the linear polyorganosiloxanes of formula (IIIa) can be those selected from the group consisting of trialkylsilyl endcapped polyorganosiloxanes or alkylhydride end-capped polyorganosiloxanes of the formula (IIIa), wherein the index "v" is 1 to about 2500, specifically 2 to about 100. Further, mixtures of linear polyorganosiloxanes (111a) and mixtures of cyclic polyorganosiloxanes (IIIb) and mixtures of linear and cyclic polyorganosiloxanes can be used as well.

Branched polyorganosiloxanes include cyclic or linear polyorganosiloxanes having branching units of the type RSiO$_{3/2}$ or SiO$_{4/2}$ where R can be a hydrogen, methyl or vinyl group.

In one embodiment wherein the equilibration reaction of step (b) is conducted with a reaction product of step (a) which is linear such as formula (IIa) the equilibration step (b) is specifically conducted with a cyclic siloxane of the formula (IIIb):

$$(R^{13}R^{14}SiO)_w \tag{IIIb}$$

where R$^{13}$ and R$^{14}$ are independently selected from hydride, methyl or a vinyl group and w=3 to about 10.

In addition, in another embodiment, when the equilibration reaction of step (b) is conducted with the reaction product of step (a) which is cyclic, such as the cyclic siloxane of formula (IIb) the equilibration step (b) is conducted with a linear siloxane of formula (IIIa):

$$R^5R^6R^7SiO(R^8R^9SiO)_vSiR^{10}R^{11}R^{12} \tag{IIIa}$$

where R$^5$, R$^6$, R$^7$, R$^8$, R$^9$, R$^{10}$, R$^{11}$, R$^{12}$, R$^{13}$, R$^{14}$ are independently selected from hydride, methyl or a vinyl group and v=1 to about 4000. In one embodiment, if the equilibration step (b) is carried out with cyclic polyorganosiloxanes, specifically the cyclic siloxane of formula (IIb), the cyclic siloxane is present in a mixture with at least one trialkylsilyl-endcapped linear polydimethylsiloxane, in order to provide an appropriate amount of terminating units.

In one embodiment herein, the reaction product of step (b) is a silicone of the formula (A):

$$M^1{}_aM^2{}_bM^3{}_cD^1{}_dD^2{}_eD^3{}_fT^1{}_gT^2{}_hT^3{}_iQ_j \tag{A}$$

wherein:
$M^1 = R^1R^2R^3SiO_{1/2}$
$M^2 = R^4R^5R^6SiO_{1/2}$
$M^3 = R^7R^8R^9SiO_{1/2}$
$D^1 = R^{10}R^{11}SiO_{2/2}$
$D^2 = R^{12}R^{13}SiO_{2/2}$
$D^3 = R^{14}R^{15}SiO_{2/2}$
$T^1 = R^{16}SiO_{3/2}$
$T^2 = R^{17}SiO_{3/2}$
$T^3 = R^{18}SiO_{3/2}$
$Q = SiO_{4/2}$ where $R^1, R^2, R^3, R^5, R^6, R^8, R^9, R^{10}, R^{11}, R^{13}, R^{15}, R^{16}$ are aliphatic, aromatic or fluoro containing monovalent hydrocarbon radicals containing from 1 to about 60 carbon atoms, specifically from about 1 to about 20 carbon atoms, more specifically from about 1 to about 8 carbon atoms;

where $R^4$, $R^{12}$, $R^{17}$ are independently selected from a group consisting of monovalent radical bearing an ionic group and having the formula $-A-SO_3M$ where where A is a divalent arylalkylene group selected from the group consisting of $-(CH_2)_lC_6H_4(CH_2)_k-$, $-CH_2CH(R^1)(CH_2)_kC_6H_4-$, and $-CH_2CH(R^1)(CH_2)_lC_6H_3R''-$ where R' is hydrogen or as defined by $R^1$, R" is a monovalent radical specifically from about 1 to about 20 carbon atoms, more specifically from about 1 to about 8 carbon atoms, sulfur atom(s), nitrogen atom(s), oxygen atom(s) or a radical containing combinations of the above atoms, l has a value of 0 to 20, specifically from 0 to about 10 and k has a value of 0 to 10, specifically from about 0 to about 10.

Examples of useful monovalent hydrocarbon radicals for silicone of formula (A) include those independently selected from the group consisting of methyl, ethyl, n-propyl, isopropyl, n-butyl, isobutyl, tert-butyl, n-pentyl, iso-pentyl, neopentyl, tert-pentyl, hexyl, such as the n-hexyl group, heptyl, such as the n-heptyl group, octyl, such as the n-octyl snf isooctyl groups, 2,2,4-trimethylpentyl, nonyl, such as the n-nonyl group, decyl, such as the n-decyl group, cycloalkyl radicals, such as cyclopentyl, cyclohexyl, cycloheptyl and methylcyclohexyl, and aryl groups such as phenyl, naphthyl; o-, m- and p-tolyl, xylyl, ethylphenyl, and benzyl.

In one embodiment of the present invention, in the formula $-A-SO_3M$, of silicone of formula (A), M is hydrogen or a cation independently selected from alkali metals, alkali earth metals, transition metals, metals, metal complexes quaternary ammonium and phosphonium groups, specifically where M can be a cation independently selected from Li, Na, K, Cs, Mg, Ca, Ba, Zn, Cu, Fe, Ni, Ga, Al, Mn, Cr, Ag, Au, Pt, Pd, Ru, Sb, Pb, Sn and Rh.

In another embodiment of the present invention, in the silicone of formula (A), $R^7$, $R^{14}$, $R^{18}$ are independently selected from hydrogen or vinyl groups, and the subscript a, b, c, d, e, f, g, h, i, j are zero or positive subject to the following limitations: the sum a+b+c+d+e+f+g+h+i+j is greater than or equal to 2 and less than or equal to 6000, specifically, a+b+c+d+e+f+g+h+i+j is greater than or equal to 2 and less than or equal to 4000, b+e+h is greater than or equal to 0 and c+f+i is greater than or equal to zero.

In another embodiment herein the process described herein further comprises wherein following the equilibration reaction of step (b) the catalyst is deactivated. When acids are used as the equilibration catalyst, the preferred deactivating agent is selected from a group consisting of potassium hydroxide, sodium hydroxide. When acid modified clay is used as the equilibration catalyst, preferably the deactivation is achieved by separation of the catalyst through filtration. When bases are used as the equilibration catalyst, the preferred deactivating agent is selected from a group consisting of hydrochloric acid, acetic acid or sulfuric acid. When tetramethylammonium siloxanolate is used as the equilibration catalyst, preferentially the deactivation is achieved by heating the reaction mixture at a temperature between 130 to 150 degrees Celsius.

Optionally, when the unneutralized intermediate obtained in step (a) is subjected to the equilibration reaction in step (b), the equilibrations are particularly carried out in absence of the catalyst and the sulfonic acid groups of the product obtained after equilibration step (b) are preferably neutralized at temperatures between 0 to about 100 degrees Celsius and about 0.001 to about 100 bar with the base selected from the groups consisting of hydroxides, ammonia, carbonates, bicarbonates and organic amines. Preferred neutralizing hydroxides are selected from the group consisting of sodium hydroxide, potassium hydroxide, lithium hydroxide, calcium hydroxide, aluminum hydroxide and ammonium hydroxide. Preferred neutralizing carbonates are selected from the group consisting of sodium carbonate, potassium carbonate, lithium carbonate, and ammonium carbonate. Preferred neutralizing bicarbonates are selected from the group consisting of sodium bicarbonate, potassium bicarbonate, lithium bicarbonate and ammonium bicarbonate. Preferred neutralizing organic amines are selected from the group consisting of ethanolamine, diethanolamine, triethanolamine, diethyl amine, dimethyl amine, trimethyl amine, triethyl amine and tributyl amine.

In one embodiment of the present invention, the hydrosilylation reaction of step (c) is conducted in the presence of any of the known hydrosilylation catalysts preferably at temperatures between about 20 to about 200 degrees Celsius. and about 0.001 to about 100 bar. The reaction between about 50 to about 150 degrees Celsius. at about 0.1 to about 10 bar, more preferably at normal pressure (1030 mbar) is particularly preferred. The hydrosilylation catalyst can be selected from the group consisting of transition metals or transition metal compounds, wherein the transition metal compound are selected from the group, consisting of platinum, rhodium, iridium, palladium, nickel, osmium, iron, cobalt, tin, zirconium, titanium, hafnium, and ruthenium, manganese, copper, silver, gold, chromium, rhenium, calcium, strontium, potassium, their various ligands, complexes, precatalysts, or mixtures thereof; Lewis acids such as $TiCl_4$, $EtAlCl_2$, $AlCl_3$ and $AlBr_3$ and mixtures thereof.

In one embodiment of the present invention, the metal of the hydrosilylation catalyst in step (c) is in the range of about 0.1 to about 1000 ppm relative to the weight of the silylhydride containing siloxane which is present in the reaction product of step (b). Preferably, the metal of the hydrosilylation catalyst in step (c) is in the range of 1 to about 50 ppm relative to the weight of the silylhydride containing siloxane which is present in the reaction product of step (b).

In another embodiment of the present invention, the unsaturated hydrocarbons in step (c) have one of the general formulae (IV to XIII):

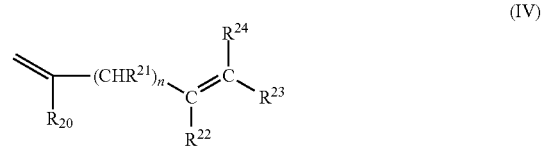

(IV)

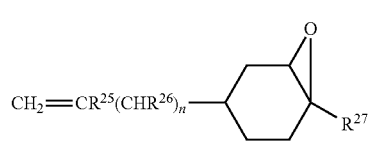 (V)

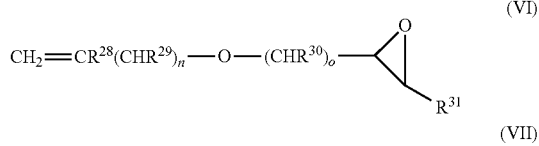 (VI)

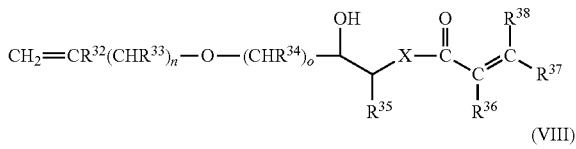 (VII)

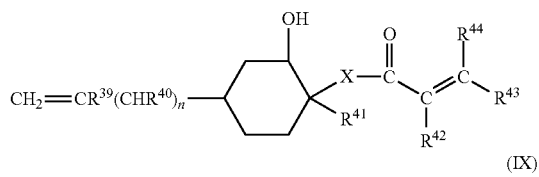 (VIII)

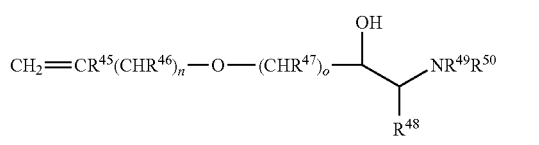 (IX)

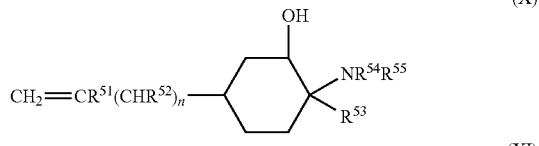 (X)

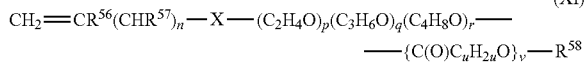 (XI)

 (XII)

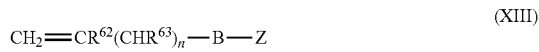 (XIII)

where $R^{20}$, $R^{21}$, $R^{26}$, $R^{29}$, $R^{30}$, $R^{33}$, $R^{34}$, $R^{40}$, $R^{46}$, $R^{47}$, $R^{52}$, $R^{63}$ are independently selected from —H, —OH, —$R^{66}$ and aliphatic/aromatic monovalent hydrocarbon having from 1 to 60 carbon atoms, specifically from 1 to about 20 carbon atoms, more specifically from 1 to about 8 carbon atoms;

where $R^{22}$, $R^{23}$, $R^{24}$, $R^{25}$, $R^{27}$, $R^{28}$, $R^{31}$, $R^{32}$, $R^{35}$, $R^{36}$, $R^{37}$, $R^{38}$, $R^{39}$, $R^{41}$, $R^{42}$, $R^{43}$, $R^{44}$, $R^{45}$, $R^{48}$, $R^{51}$, $R^{53}$, $R^{56}$, $R^{57}$, $R^{59}$, $R^{60}$, $R^{61}$, $R^{62}$ are independently selected from hydrogen, aliphatic/aromatic monovalent hydrocarbon having from 1 to 60 carbon atoms, specifically from 1 to about 20 carbon atoms, more specifically from 1 to about 8 carbon atoms;

Where $R^{58}$ is hydrogen or a monovalent alkyl radical with 2 to about 20 carbon atoms or a heteroatom where $R^{49}$, $R^{50}$, $R^{54}$, $R^{55}$ are independently selected from —H, —$C_tH_{2t}OH$ and aliphatic/aromatic monovalent hydrocarbon having from 1 to 60 carbon atoms, specifically from 1 to about 20 carbon atoms, more specifically from 1 to about 8 carbon atoms, wherein t is a positive integer, specifically 1 to 20 where L is a monovalent radical independently selected from halogen, $OR^{64}$, —$CO(O)R^{65}$, —$N=CR^{66}_2$, —NCO, —$NC(O)R^{67}$, —$C\equiv N$, —$N\equiv N$ and —$NR^{68}_2$ where $R^{64}$, $R^{65}$, $R^{66}$, $R^{67}$, $R^{68}$ are independently selected from a group consisting of hydrogen and alkyl, alkenyl, cycloalkyl and aryl of from 1 to about 60 carbon atoms, specifically from 1 to about 20 carbon atoms, more specifically from 1 to about 8 carbon atoms;

where Z is a monovalent radical independently selected from halogen, $OR^{64A}$, —$CO(O)R^{65}$, —$N=CR^{66}_2$, —NCO, —$NC(O)R^{67}$, —$C\equiv N$, —$N\equiv N$ and —$NR^{68A}_2$ where $R^{65}$, $R^{66}$, $R^{67}$ are independently selected from a group consisting of hydrogen, alkyl, alkenyl, cycloalkyl and aryl, and where $R^{64A}$ is hydrogen or independently selected from a group consisting of alkyl, alkenyl, cycloalkyl and aryl containing from 1 to about 60 carbon atoms, specifically from 1 to about 20 carbon atoms, more specifically from 1 to about 8 carbon atoms, alkyl, alkenyl, cycloalkyl and aryl containing from 2 to about 60 carbon atoms, specifically from 2 to about 20 carbon atoms, more specifically from 2 to about 8 carbon atoms, and where $R^{68A}$ is independently selected from a group consisting of hydrogen, alkenyl, cycloalkyl and aryl containing from 1 to about 60 carbon atoms, specifically from 1 to about 20 carbon atoms, more specifically from 1 to about 8 carbon atoms;

where X is a divalent radical selected from —$CHR^{65}$—, —O—, —$NR^{65}$— and —S— linkages, where B is a divalent radical selected from a linear, branched, cyclic hydrocarbon radical or aralkyl radical of from 1 to about 60 carbon atoms, specifically from 1 to about 20 carbon atoms, more specifically from 1 to about 8 carbon atoms and which may contain a heteroatom;

where the subscript n is zero or a positive integer and has a value in the range of 0 to 60, specifically from 0 to about 20, more specifically 0 to about 8, where subscript o is positive integer and has a value in the range of 1 to 60, specifically 1 to about 20, where subscripts p, q, r, u and v are zero or positive and independently selected from a value in the range of 0 to 100, specifically from about 0 to about 20 subject to the limitation of o+p+q+r+v is greater than or equal to 1 and s is zero or a positive integer and has a value of 0 to 2.

In another specific embodiment, the invention consists of optionally subjecting the epoxide-containing reaction product of (c) to a ring-opening reaction preferentially in presence of a suitable catalyst with a hydroxyl, amine, carboxylic acid and thiol containing hydrocarbons, azide containing molecules or water.

The epoxide-containing product used in the step (d) can have the general formula (A) Where $R^7$, $R^{14}$ and $R^{18}$ are monovalent hydrocarbon radical selected from the group of formula XIV and XV.

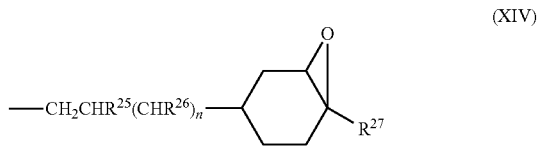 (XIV)

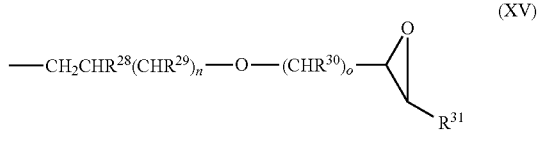 (XV)

Where $R^{25}$, $R^{26}$, $R^{27}$, $R^{28}$, $R^{29}$, $R^{30}$ and $R^{31}$ are defined above.

The hydroxyl containing hydrocarbons used in step (d) can be selected from the group consisting of aliphatic or aromatic alcohol containing 1 to 60 carbon atoms.

The amine containing hydrocarbons used in step (d) can be selected from the group consisting of aliphatic or aromatic amine containing 1 to 60 carbon atoms.

The carboxylic acid containing hydrocarbons used in step (d) can be selected from the group consisting of aliphatic or aromatic carboxylic acid containing 1 to 60 carbon atoms. The thiol containing hydrocarbons used in (d) can be selected from the group consisting of the aliphatic or aromatic alcohol containing 1 to 60 carbon atoms.

The azide containing molecules used in step (d) can be a selected from a group consisting of sodium azide, calcium azide, potassium azide, Lithium azide, trimethylsilyl azide.

The catalyst used in step (d) are selected from the group of a variety of organometallic compounds preferably organo tin, titanium, zinc, calcium compounds but one can also use Lewis acids or Broensted acids or basis, preferred acids and basis are such types with low vapour pressure, C1-C8 carbonacids or alkylamines.

The reaction of step (d) can optionally be done in presence of suitable solvent selected from the group consisting of aliphatic alcohols, glycol ethers, cycloaliphatic alcohols, aliphatic esters, cycloaliphatic esters, aliphatic hydrocarbons, cycloaliphatic hydrocarbons, aromatic hydrocarbons, halogenated aliphatic compounds, halogenated cycloaliphatic compounds, halogenated aromatic compounds, aliphatic ethers, cycloaliphatic ethers, amide solvents, and sulfoxide solvents.

In one specific embodiment, of the present invention the silicone made by the process described herein is selected from the group consisting of sulfonic acid functionalized tetramethyldisiloxane, sulfonic acid functionalized octamethyltetracyclosiloxane, sulfonic acid functionalized heptamethyltrisiloxane, terminal sulfonate functional polyorganosiloxane, pendant sulfonate functional polyorganosiloxane, sulfonate functional polyorganosiloxane, or with one or more of the following functional groups in combination: terminal hydride groups, pendant hydride groups, terminal epoxy groups, pendant epoxy groups, pendant epoxy ether groups, terminal epoxy ether groups, pendant alkoxysilane groups, terminal alkoxysilane groups, terminal polyether groups, pendant polyether groups, terminal vinyl groups, pendant vinyl groups, pendant acrylate groups and terminal acrylate groups.

In yet another embodiment of the present invention, there is provided an application containing the silicone composition made by the process described herein, specifically wherein the application is selected from the group consisting of personal care, health care, automotive, household, paints, coatings, laundry detergent, textile treatment, oil and gas, fuel cell, electronic application, agriculture, membranes, adhesives, sealants, injection moldable and compression moldable rubbers and plastics, and various silicone based rubbers.

The level of incorporation of ionic groups into the ionic silicones the silicone made by the process described herein into specific application can vary greatly depending upon the specific application in which it is employed, but generally can range from slightly above 0 mole % to about 100 mol %, more specifically from about 0.01 mol % to about 20 mol %, and most specifically from about 0.01 mol % to about 5 mol % of the total weight of the application composition.

In the process steps described herein any combination/ reaction described herein can take place piece-meal over time or simultaneously upon addition of the reactant components. Furthermore, the ionic silicone composition made by the process described herein can be prepared (e.g., combined) using either batch semi-batch or continuous modes of manufacture and in equipment suitable for the process conditions and the scale of manufacture.

EXAMPLES

The examples below are provided for the purpose of illustrating the present invention. Preparative examples 1-29 are part of the invention.

Example 1

Sulfonic Acid Functionalized Tetramethyldisiloxane

A three necked 500 mL flask was charged with 18.16 g (154.0 mmol) alpha-methylstyrene and $27.2 \times 10^{-5}$ g platinum catalyst. The temperature of the resulting mixture was brought to 115 degrees Celsius, then 9.40 g (70.0 mmol) 1,1,3,3 tetramethyldisiloxane was added drop wise and continued to stir until completion of the hydrosilylation reaction. The complete hydrosilylation was indicated by the disappearance of silicone hydride peak in the $^1$H NMR. The resulting mixture was vacuum stripped to remove unreacted alpha-methylstyrene by placing on an oil bath at 150 degrees Celsius for 2 h which gave 23.2 g aralkylene substituted disiloxane. (Yield: 90%).

To this aralkylene substituted disiloxane (23.2 g, 62.4 mmol), 29.6 g (252.8 mmol) of chlorosulfonic acid was added drop wise through a period of 30 minutes while the mixture being stirred at room temperature. The resulting mixture was continued to stir for additional 30 minutes. The completion of the reaction was determined by $^1$H NMR where total sulfonation of the aromatic ring was indicated by the disappearance of para-substituted aromatic proton peak. The vacuum stripping of the reaction mixture at low pressure afforded 33.0 g of the sulfonated disiloxane as brown viscous oil.

$^1$H NMR: (ppm) 0.02 (s, 12H), 1.07 (d, 4H), 1.31 (d, 6H), 3.02 (q, 2H), 7.36 (d, 4H), 7.75 (d, 4H). $^{29}$Si NMR: (ppm) 6.9.

Example 2

Sulfonic Acid Functionalized Tetramethyltetracyclosiloxane

A three necked 500 mL flask was charged with 70.08 g (60.0 mmol) alpha-methylstyrene and $10.0 \times 10^{-4}$ g platinum catalyst. The temperature of the resulting mixture was brought to 115 degrees Celsius, then 30.0 g (120.5 mmol) 1,3,5,7-tetramethylcyclotetrasiloxane was added drop wise and continued to stir. The progress of the reaction mixture was monitored by $^1$H NMR. After 12 h of the reaction, complete conversion of silicone hydride was indicated by the NMR. Then, the reaction mixture was vacuum stripped at 150 degrees Celsius for 2 h to remove unreacted alpha-methylstyrene which gave 80.5 g aralkylene substituted cyclotetrasiloxane. (Yield: 95%).

To 14.24 g (20.0 mmol) of the above aralkylene substituted cyclotetrasiloxane, 18.64 g (160.0 mmol) chlorosulfonic acid dissolved in 4.0 mL dichloromethane was added drop wise through a period of 30 minutes while the mixture being stirred at room temperature. The resulting mixture was continued to stir for an additional 30 minutes. The completion of the reaction was indicated by $^1$H NMR where complete sulfonation of the aromatic ring was indicated by the disappearance of para-substituted aromatic proton peak. The vacuum stripping of the reaction mixture at low pressure afforded 20.6 g of the sulfonic acid functional cyclotetrasiloxane as brown viscous gum.

$^1$H NMR: (ppm) −0.08 (s, 12H), 1.05 (m, 8H), 1.32 (m, 12H), 3.03 (m, 4H), 7.36 (d, 8H), 7.76 (d, 8H). $^{29}$Si NMR: (ppm) −23.0, −20.5.

Example 3

Sulfonic Acid Functionalized Heptamethyltrisiloxane

A three necked 500 mL flask was charged with 141.5 g (1200.0 mmol) alpha-methylstyrene and $54.0 \times 10^{-3}$ g platinum catalyst. The temperature of the resulting mixture was brought to 115 degrees Celsius followed by drop wise addition of 222.0 g (1000.0 mmol) 1,1,1,3,5,5,5 heptamethyltrisiloxane under stirring. The resulting mixture was continued to heat at 115 degrees Celsius until complete hydrosilylation of the hydride was obtained. The complete hydrosilylation was indicated by the disappearance of silicone hydride peak in the $^1$H NMR. The resulting mixture was vacuum stripped to remove unreacted alphamethylstyrene by placing on a oil bath at 150 degrees Celsius for 2 h which gave 326.0 g (96%) aryl substituted disiloxane.

To this aryl substituted trisiloxane (34.0 g, 100.0 mmol), 23.2 g (200.0 mmol) of chlorosulfonic acid was added drop wise through a period of 30 minutes while the mixture being stirred at room temperature. The resulting mixture was continued to stir for additional 30 minutes. The completion of the reaction was determined by $^1$H NMR where total sulfonation of the aromatic ring was indicated by the disappearance of para-substituted aromatic proton peak. The vacuum stripping of the reaction mixture at low pressure afforded 42.0 g of the sulfonated disiloxane as brown viscous oil.

Example 4

Sodium Salt of Terminal Sulfonic Acid Functional Polyorganosiloxane

To the sulfonic acid functional disiloxane 8.38 g (15.8 mmol) obtained in Example 1, 468.63 g (1580.0 mmol) octamethyltetracyclosiloxane was added and continued to stir at room temperature. After reaching an equilibrium of ~87 wt % of the linear siloxanes, the reaction mixture was neutralized using 10.6 (126.0 mmol) moistened sodium bicarbonate at 70 degrees Celsius. The vacuum stripping of the reaction mixture at low pressure afforded 541.4 g of the product as viscous gum. The NMR analysis of the product indicated that the polymer was a salt of terminal sulfonic acid functional polydimethylsiloxane. The polymer had a viscosity of 26.5 Pas at a shear rate of 10 rad/s when measured by a HAAKE Rheometer at 20 degrees Celsius.

Example 5

Sodium Salt of Pendant Sulfonic Acid Functional Polyorganosiloxane

To 20.66 g (20.0 mmol) of the sulfonic acid functionalized cyclotetrasiloxane obtained from Example 2, 53.3 g (180.0 mmol) octamethyltetracyclosiloxane and 0.324 g (2.0 mmol) 1,1,1,3,3,3-hexamethyldisiloxane were added and continued to stir at room temperature. After 6 h of reaction, an equilibration of ~87% was indicated by solid content analysis. The reaction mixture was then neutralized in presence of hexane (200 mL) and 26.9 g (320.0 mmol) moistened sodium bicarbonate. The excess salts and bicarbonate were removed by filtration. The filtrate was vacuum stripped at 30 mmHg/70 degrees Celsius when the sodium salt of pendant sulfonic acid functional polysiloxane was obtained as white solid (71.0 g) Yield: 85%.

Example 6

Sodium Salt of Sulfonic Acid Functional Polyorganosiloxane Bearing Terminal Hydride Groups To the sulfonic acid functional cyclotetrasiloxane 20.6 g (20.0 mmol) obtained in Example 2, 587.26 g (1980.0 mmol) octamethyltetracyclosiloxane and 3.54 g (26.4 mmol) 1,1,3,3-tetramethyldisiloxane were added and continued to stir at room temperature. After reaching an equilibrium of ~87 wt % of the linear siloxanes, the reaction mixture was neutralized using 26.9 (320.0 mmol) moistened sodium bicarbonate at 70 degrees Celsius. The vacuum stripping of the reaction mixture at low pressure afforded 542.0 g (85%) of the product as viscous gum. The NMR analysis of the product indicated that the polymer is a sodium salt of sulfonic acid functional polydimethylsiloxane bearing terminal group. The polymer had a viscosity of 47.5 Pas at a shear rate of 10 rad/s when measured by a HAAKE Rheometer at 20 degrees Celsius.

Example 7

Sodium Salt of Sulfonic Acid Functional Polyorganosiloxane Bearing Pendant Hydride Groups To the sulfonic acid functional disiloxane 8.38 g (15.8 mmol) obtained in Example 1, 468.63 g (1580.0 mmol) octamethyltetracyclosiloxane and 3.72 g (15.8 mmol) 1,3,5,7-tetramethylcyclotetrasiloxane were added and continued to stir at room temperature. After reaching an equilibrium of ~87% the reaction mixture was neutralized using 10.6 g (126.0 mmol) moistened sodium bicarbonate at 70 degrees Celsius. The vacuum stripping of the reaction mixture at low pressure afforded 541.4 g of the product as viscous gum. The NMR analysis of the product indicated that the polymer is a sodium salt of sulfonic acid functional polydimethylsiloxane bearing pendant hydride groups.

Example 8

Sodium Salt of Sulfonic Acid Functional Polyorganosiloxane Bearing Terminal Epoxy Ether Groups To the hydride-terminated sulfonated polydimethylsiloxane 118.4 g (5.0 mmol) obtained in Example 6, 100.0 mL toluene, 1.48 g (13.0 mmol) allylglycidyl ether and $1.20 \times 10^{-3}$ g of platinum catalyst were added and continued to reflux at 100 degrees Celsius for 12 h. At this point, the complete reaction of the silicon-hydride bond with the allylglycidyl ether molecules was indicated by $^1$H NMR. The vacuum stripping of the reaction mixture at low pressure afforded 119.5 g of the product a viscous gum. The NMR analysis of the product indicated that the polymer is a sodium salt of sulfonic acid functional polydimethylsiloxane bearing terminal epoxy ether group. The polymer had a viscosity of 201.5 Pas at a shear rate of 10 rad/s when measured by a HAAKE Rheometer at 20 degrees Celsius.

Example 9

Sodium Salt of Sulfonic Acid Functional Polyorganosiloxane Bearing Terminal Epoxy Groups To the hydride-terminated sulfonated polydimethylsiloxane 11.8 g (0.5 mmol) obtained in Example 6, 20.0 mL toluene, 0.16 g (1.3 mmol) 1,2-epoxy-4-vinylcyclohexene and $1.20 \times 10^{-4}$ g of platinum catalyst were added and continued to reflux at 100 degrees Celsius for 12 h. At this point, the complete reaction of the silicon-hydride bond with the vinyl-cyclohexyl epoxide molecules was indicated by $^1$H NMR. The vacuum stripping of the reaction mixture at low pressure afforded 11.9 g of the product an as viscous gum. The NMR analysis of the product indicated that the polymer is a sodium salt of sulfonic acid functional polydimethylsiloxane bearing terminal epoxy group. The polymer had a viscosity of 70.0 Pas at a shear rate of 10 rad/s when measured by a HAAKE Rheometer at 20 degrees Celsius.

Example 10

Sodium Salt of Sulfonic Acid Functional Polyorganosiloxane Bearing Pendant Epoxy Ether Groups To the sulfonic acid functional disiloxane 8.38 g (15.8 mmol) obtained in Example 1, 468.63 g (1580.0 mmol) octamethyltetracyclosiloxane and 3.72 g (15.8 mmol) 1,3,5,7-tetramethylcyclotetrasiloxane were added and continued to stir at room temperature. After reaching an equilibrium of ~87 wt % of the linear siloxanes, the reaction mixture was neutralized using 10.6 (126.0 mmol) moistened sodium bicarbonate at 70 degrees Celsius. The vacuum stripping of the reaction mixture at low pressure afforded 541.4 g of the product as viscous gum. The NMR analysis of the product indicated that the polymer is a sodium salt of sulfonic acid functional polydimethylsiloxane bearing pendant hydride groups.

To 29.6 g (1.0 mmol) of the above product, 50.0 mL toluene, 0.59 g (5.2 mmol) allylglycidyl ether and $4.0 \times 10^{-4}$ g of platinum catalyst were added and continued to reflux at 100 degrees Celsius for 12 h. The vacuum stripping of the reaction mixture at low pressure afforded 29.9 g the product as viscous gum. The NMR analysis of the product has indicated the polymer is a sodium salt of sulfonic acid functional polydimethylsiloxane bearing pendant epoxy ether groups.

Example 11

Sodium Salt of Sulfonic Acid Functional Polyorganosiloxane Bearing Pendant Hydride and Epoxy Ether Groups To the sulfonic acid functional disiloxane 8.38 g (15.8 mmol) obtained in Example 1, 468.63 g (1580.0 mmol) octamethyltetracyclosiloxane and 3.72 g (15.8 mmol) 1,3,5,7-tetramethylcyclotetrasiloxane were added and continued to stir at room temperature. After reaching an equilibrium of ~87 wt % of the linear siloxanes, the reaction mixture was neutralized using 10.6 (126.0 mmol) moistened sodium bicarbonate at 70 degrees Celsius. The vacuum stripping of the reaction mixture at low pressure afforded 541.4 g of the product as viscous gum. The NMR analysis of the product indicated that the polymer is a sodium salt of sulfonic acid functional polydimethylsiloxane bearing pendant hydride groups.

To 29.6 g (1.0 mmol) of the above product, 50.0 mL toluene, 0.22 g (2.0 mmol) allylglycidyl ether and $4.0 \times 10^{-4}$ g of platinum catalyst were added and continued to reflux at 100 degrees Celsius for 12 h. The vacuum stripping of the reaction mixture at low pressure afforded 29.8 g the product as viscous gum. The NMR analysis of the product has indicated the polymer is a sodium salt of sulfonic acid functional polydimethylsiloxane bearing pendant hydride and epoxy ether groups.

Example 12

Sodium Salt of Sulfonic Acid Functional Polyorganosiloxane Bearing Pendant Alkoxysilane Groups To the sulfonic acid functional disiloxane 8.38 g (15.8 mmol) obtained in Example 1, 468.63 g (1580.0 mmol) octamethyltetracyclosiloxane and 3.72 g (15.8 mmol) 1,3,5,7-tetramethylcyclosiloxane were added and continued to stir at room temperature. After reaching an equilibrium of ~87 wt % of the linear siloxanes, the reaction mixture was neutralized using 10.6 (126.0 mmol) moistened sodium bicarbonate at 70 degrees Celsius. The vacuum stripping of the reaction mixture at low pressure afforded 541.4 g of the product as viscous gum. The NMR analysis of the product indicated that the polymer is a sodium salt of sulfonic acid functional polydimethylsiloxane bearing pendant hydride groups.

To 29.6 g (1.0 mmol) of the above product, 50.0 mL toluene, 0.85 g (5.2 mmol) allyltrimethoxysilane and $4.0 \times 10^{-4}$ g of platinum catalyst were added and continued to reflux at 100 degrees Celsius for 12 h. The vacuum stripping of the reaction mixture at low pressure afforded 30.3 g of the product as a viscous gum. The NMR analysis of the product has indicated that the polymer is a sodium salt of sulfonic acid functional polydimethylsiloxane bearing pendant trimethoxysilane groups.

Example 13

Sodium Salt of Sulfonic Acid Functional Polyorganosiloxane Bearing Pendant Hydride and Alkoxysilane Groups To the sulfonic acid functional disiloxane 8.38 g (15.8 mmol) obtained in Example 1, 468.63 g (1580.0 mmol) octamethyltetracyclosiloxane and 3.72 g (15.8 mmol) 1,3,5,7-tetramethylcyclotetrasiloxane were added and continued to stir at room temperature. After reaching an equilibrium of ~87 wt % of the linear siloxanes, the reaction mixture was neutralized using 10.6 (126.0 mmol) moistened sodium bicarbonate at 70 degrees Celsius. The vacuum stripping of the reaction mixture at low pressure afforded 541.4 g of the product as viscous gum. The NMR analysis of the product indicated that the polymer is a sodium salt of sulfonic acid functional polydimethylsiloxane bearing pendant hydride groups.

To 29.6 g (1.0 mmol) of the above product, 50.0 mL toluene, 0.32 g (2.0 mmol) allyltrimethoxysilane and $4.0 \times 10^{-4}$ g of platinum catalyst were added and continued to reflux at 100 degrees Celsius for 12 h. The vacuum stripping of the reaction mixture at low pressure afforded 29.9 g of the product as a viscous gum. The NMR analysis of the product has indicated that the polymer is a sodium salt of sulfonic acid functional polydimethylsiloxane bearing pendant hydride and trimethoxysilane groups.

Example 14

Sodium Salt of Sulfonaic Acid Functional Polyorganosiloxane Bearing Terminal Alkoxysilane Groups To the sulfonate functional polydimethylsiloxane bearing terminal hydride groups 59.2 g (2.5 mmol) obtained in Example 6, 50.0 mL toluene, 1.24 g (6.5 mmol) vinyltriethoxysilane 8.0×10$^{-4}$ g of platinum catalyst were added and continued to reflux for 12 h. At this point, the complete reaction of the silicon-hydride bonds with the vinyltriethoxysilane was indicated by NMR. The vacuum stripping of the reaction mixture at low pressure afforded 65.3 g of the product as a viscous gum. The NMR analysis of the product has indicated that the polymer is a sodium salt of sulfonic acid functional polydimethylsiloxane bearing terminal triethoxysilane groups.

Example 15

Sodium Salt of Sulfonic Acid Functional Polyorganosiloxane Bearing Terminal Polyether Groups To the hydride-terminated sulfonated polydimethylsiloxane 11.8 g (0.5 mmol) obtained in Example 6, 20.0 mL toluene, 0.32 g (1.3 mmol) allylpolyether (PEG AM 250) and 1.20×10$^{-4}$ g of platinum catalyst were added and continued to reflux at 100 degrees Celsius for 12 h. At this point, the complete reaction of the silicon-hydride bond with the allylpolyether molecules was indicated by $^1$H NMR. The vacuum stripping of the reaction mixture at low pressure afforded 12.1 g of the product as waxy solid. The NMR analysis of the product has indicated the polymer is a sodium salt of sulfonic acid functional polydimethylsiloxane bearing the terminal polyether groups. The polymer had a viscosity of 169.3 Pas at a shear rate of 10 rad/s when measured by a HAAKE Rheometer at 20 degrees Celsius.

Example 16

Sodium Salt of Sulfonic Acid Functional Polyorganosiloxane Bearing Terminal Vinyl Groups To the sulfonic acid functional cyclotetrasiloxane 8.26 g (8.0 mmol) obtained in Example 2, 474.7 g (1600.0 mmol) octamethyltetracyclosiloxane and 1.48 g (8.0 mmol) 1,1,3,3-tetramethyl-1,3-divinyldisiloxane were added and continued to stir at room temperature. After reaching equilibrium of ~87 wt % of the linear siloxanes, the reaction mixture was neutralized using 10.8 g (128.0 mmol) moistened sodium bicarbonate at 70 degrees Celsius. The vacuum stripping of the reaction mixture at low pressure afforded 411.0 g of the product as viscous gum. The NMR analysis of the product indicated that the polymer is a sodium salt of sulfonic acid functional polydimethylsiloxane bearing terminal vinyl groups. The polymer had a viscosity of 5.4 Pas at a shear rate of 10 rad/s when measured by a HAAKE Rheometer at 20 degrees Celsius.

Example 17

Sodium Salt of Sulfonic Acid Functional Polyorganosiloxane Bearing Terminal Acrylate Groups To the epoxy-terminated sulfonated polydimethylsiloxane 38.8 g (1.5 mmol) obtained in Example 9, 50.0 mL toluene, 4.2×10$^{-3}$ g of Ti(OPr$^i$)$_4$ catalyst and 3.93×10$^{-5}$ g of 4-hydroxy TEMPO were added. The resulting mixture was heated to 115 degrees Celsius and then 0.43 g of acrylic acid was added drop-wise. The resulting mixture was continued to stir at 115 degrees Celsius for 48 h. The vacuum stripping of the reaction mixture at low pressure afforded 39.0 g of the product as a viscous gum. The NMR analysis of the product has indicated that the polymer is a sodium salt of sulfonic acid functional polydimethylsiloxane bearing terminal acrylate groups. The polymer had a viscosity of 156.9 Pas at a shear rate of 10 rad/s when measured by a HAAKE Rheometer at 20 degrees Celsius.

Example 18

Sodium Salt of Sulfonic Acid Functional Polyorganosiloxane Bearing Pendant Hydride and Polyether Groups To the sulfonic acid functional disiloxane 8.38 g (15.8 mmol) obtained in Example 1, 468.63 g (1580.0 mmol) octamethyltetracyclosiloxane and 3.72 g (15.8 mmol) 1,3,5,7-tetramethylcyclotetrasiloxane were added and continued to stir at room temperature. After reaching an equilibrium of ~87 wt % of the linear siloxanes, the reaction mixture was neutralized using 10.6 (126.0 mmol) moistened sodium bicarbonate at 70 degrees Celsius. The vacuum stripping of the reaction mixture at low pressure afforded 541.4 g of the product as viscous gum. The NMR analysis of the product indicated that the polymer is a sodium salt of sulfonic acid functional polydimethylsiloxane bearing pendant hydride groups.

To 14.8 g (0.5 mmol) of the above product, 20.0 mL toluene, 0.45 g (1.0 mmol) allylpolyether (PEG AM 450) and 1.20×10$^{-4}$ g of platinum catalyst were added and continued to reflux at 100 degrees Celsius for 12 h. The vacuum stripping of the reaction mixture at low pressure afforded 15.1 g of the product as waxy solid. The NMR analysis of the product has indicated the polymer is a sodium salt of sulfonic acid functional polydimethylsiloxane bearing pendant hydride and polyether groups.

Example 19

Sodium Salt of Sulfonic Acid Functional Polyorganosiloxane Bearing Pendant Polyether and Epoxy Groups To the sulfonic acid functional disiloxane 8.38 g (15.8 mmol) obtained in Example 1, 468.63 g (1580.0 mmol) octamethyltetracyclosiloxane and 3.72 g (15.8 mmol) 1,3,5,7-tetramethylcyclotetrasiloxane were added and continued to stir at room temperature. After reaching an equilibrium of ~87 wt % of the linear siloxanes, the reaction mixture was neutralized using 10.6 (126.0 mmol) moistened sodium bicarbonate at 70 degrees Celsius. The vacuum stripping of the reaction mixture at low pressure afforded 541.4 g of the product as viscous gum. The NMR analysis of the product indicated that the polymer is a sodium salt of sulfonic acid functional polydimethylsiloxane bearing pendant hydride groups.

To 14.8 g (0.5 mmol) of the above product, 20.0 mL toluene, 0.45 g (1.0 mmol) allylpolyether (PEG AM 450) and 1.20×10$^{-4}$ g of platinum catalyst were added and continued to reflux at 100 degrees Celsius for 12 h. The vacuum stripping of the reaction mixture at low pressure afforded 15.2 g of the product as waxy solid. The NMR analysis of the product has indicated the polymer is a sodium salt of sulfonic acid functional polydimethylsiloxane bearing pendant hydride and polyether groups.

To 15.2 g (0.5 mmol) of the above product, 20.0 mL toluene, 0.12 g (1.0 mmol) 1,2-epoxy-4-vinylcyclohexene and 1.20×10$^{-4}$ g of platinum catalyst were added and continued to reflux at 100 degrees Celsius for 12 h. The vacuum stripping of the reaction mixture at low pressure afforded 15.3 g of the product as waxy solid. The NMR analysis of the product has indicated the polymer is a sodium salt of sulfonic acid functional polydimethylsiloxane bearing pendant polyether and epoxy groups.

Example 20

Sodium Salt of Sulfonic Acid Functional Polyorganosiloxane Bearing Pendant Hydride and Epoxy Groups To the sulfonic acid functional disiloxane 8.38 g (15.8 mmol) obtained in Example 1, 468.63 g (1580.0 mmol) octamethyltetracyclosiloxane and 3.72 g (15.8 mmol) 1,3,5,7-tetramethylcyclotetrasiloxane were added and continued to stir at room temperature. After reaching an equilibrium of ~87 wt % of the linear siloxanes, the reaction mixture was neutralized using 10.6 (126.0 mmol) moistened sodium bicarbonate at 70 degrees Celsius. The vacuum stripping of the reaction mixture at low pressure afforded 541.4 g of the product as viscous gum. The NMR analysis of the product indicated that the polymer is a sodium salt of sulfonic acid functional polydimethylsiloxane bearing pendant hydride groups.

To 14.8 g (0.5 mmol) of the above product, 20.0 mL toluene, 0.12 g (1.0 mmol) 1,2-epoxy-4-vinylcyclohexene and $1.20 \times 10^{-4}$ g of platinum catalyst were added and continued to reflux at 100 degrees Celsius for 12 h. The vacuum stripping of the reaction mixture at low pressure afforded 14.9 g of the product as waxy solid. The NMR analysis of the product has indicated the polymer is a sodium salt of sulfonic acid functional polydimethylsiloxane bearing pendant hydride and epoxy groups.

Example 21

Sodium Salt of Sulfonic Acid Functional Polyorganosiloxane Bearing Pedant Vinyl Groups To the sulfonic acid functional disiloxane 4.17 g (7.9 mmol) obtained in Example 1, 234.3 g (790.0 mmol) octamethyltetracyclosiloxane and 5.4 g (15.8 mmol) 1,3,5,7-tetramethyl-1,3,5,7 tetravinylcyclotetrasiloxane were added and continued to stir at room temperature. After reaching an equilibrium of ~87% the reaction mixture was neutralized using 5.3 (63.0 mmol) moistened sodium bicarbonate at 70 degrees Celsius. The vacuum stripping of the reaction mixture at low pressure afforded 215.0 g of the product as viscous gum. The NMR analysis of the product indicated that the polymer is a sodium salt of sulfonic acid functional polydimethylsiloxane bearing pendant vinyl groups. The polymer had a viscosity of 19.3 Pas at a shear rate of 10 rad/s when measured by a HAAKE Rheometer at 20 degrees Celsius.

Example 22

Sodium Salt of Sulfonic Acid Functionalized Polysiloxane Resin

A three necked 500 mL flask was charged with 20.7 g phenylpropyldimethylsiloxysilicate, 2.0 g chlorosulfonic acid was added drop wise through a period of 30 minutes while the mixture being stirred at room temperature. The resulting mixture was neutralized using 8.5 (102.0 mmol) moistened sodium bicarbonate at 70 degrees Celsius continued to stir for an additional 30 minutes. The excess bicarbonate was removed by filtration. The vacuum stripping of the filtrate at low pressure afforded 25.6 g of the sodium salt of sulfonic acid functional polysiloxane resin. The polymer had a viscosity of 3.8 Pas at a shear rate of 10 rad/s when measured by a HAAKE Rheometer at 20 degrees Celsius.

Example 23

Triethanolammonium Salt of Terminal Sulfonic Acid Functional Polyorganosiloxane

A three necked 500 mL flask was charged with 10.6 g (20.0 mmol) sulfonic acid functional disiloxane (from example 1), 118.0 g (400.0 mmol) octamethyltetracyclosiloxane. The reaction mixture was placed into an oil bath and continued to stir at room temperature. After reaching an equilibrium of ~87 wt % of the linear siloxanes, the reaction mixture was neutralized using 8.56 g (80.0 mmol) triethanol amine at 70 degrees Celsius. The vacuum stripping of the reaction mixture at low pressure afforded 114.0 g of the product as viscous gum. The NMR analysis of the product indicated that the polymer was a sulfonated-capped polydimethylsiloxane with an average D-length of 80. The polymer had a viscosity of 5399 Pas at a shear rate of 10 rad/s when measured by a HAAKE Rheometer at 20 degrees Celsius.degrees.

Example 24

Sulfonic Acid Functional Polyorganosiloxane Bearing Terminal Vinyl Groups

To the sulfonic acid functional cyclotetrasilane 8.26 g (8.0 mmol) obtained in Example 2, 474.5 g (1600.0 mmol) octamethyltetracyclosiloxane and 1.48 g (8.0 mmol) 1,1,3,3-tetramethyl-1,3-divinyldisiloxane were added and continued to stir at room temperature. After 6 h, an equilibrium of ~87 wt % of the linear siloxanes was reached to give sulfonic acid functional polydimethylsiloxane bearing terminal vinyl groups. The polymer had a viscosity of 29.7 Pas at a shear rate of 10 rad/s when measured by a HAAKE Rheometer at 20 degrees Celsius.

Example 25

Silver Salt of Sulfonic Acid Functional Polyorganosiloxane Bearing Terminal Vinyl Groups To the sulfonic acid functional polydimethylsiloxane 10.00 g (0.3 mmol) obtained in Example 24, 0.28 g (1.2 mmol) moistened silver oxide was added and continued to stir at 70 degrees Celsius for 6 h when the silver salt of sulfonic acid functional polydimethylsiloxane bearing terminal vinyl groups was obtained as viscous gum. The polymer had a viscosity of 55.8 Pas at a shear rate of 10 rad/s when measured by a HAAKE Rheometer at 20 degrees Celsius.

Example 26

Magnesium Salt of Sulfonic Acid Functional Polyorganosiloxane Bearing Terminal Vinyl Groups To the sulfonic acid functional polydimethylsiloxane 10.00 g (0.3 mmol) obtained in Example 24, 0.03 g (0.6 mmol) moistened magnesium oxide was added and continued to stir at 70 degrees Celsius for 6 h when the magnesium salt of sulfonic acid functional polydimethylsiloxane bearing ter-

Example 27

Lithium Salt of Sulfonic Acid Functional Polyorganosiloxane Bearing Terminal Vinyl Groups To the sulfonic acid functional polydimethylsiloxane 10.00 g (0.3 mmol) obtained in Example 24, 0.03 g (1.2 mmol) moistened lithium hydroxide was added and continued to stir at 70 degrees Celsius for 6 h when the lithium salt of sulfonic acid functional polydimethylsiloxane bearing terminal vinyl groups was obtained as viscous gum. The polymer had a viscosity of 10.6 Pas at a shear rate of 10 rad/s when measured by a HAAKE Rheometer at 20 degrees Celsius.

Example 28

Triethylammoium salt of Sulfonic Acid Functional Polyorganosiloxane Bearing Terminal Vinyl Groups To the sulfonic acid functional polydimethylsiloxane 10.00 g (0.3 mmol) obtained in Example 0.12 g (1.2 mmol) triethyl amine was added and continued to stir at room temperature for 6 h when the triethylammonium salt of sulfonic acid functional polydimethylsiloxane bearing terminal vinyl groups was obtained as viscous gum. The polymer had a viscosity of 5.6 Pas at a shear rate of 10 rad/s when measured by a HAAKE Rheometer at 20 degrees Celsius.

Example 29

Triethylammonium Salt of Sulfonic Acid Functional Polyorganosiloxane Bearing Pendant Hydride Groups To the sulfonic acid functional disiloxane 8.38 g (15.8 mmol) obtained in Example 1, 468.63 g (1580.0 mmol) octamethyltetracyclosiloxane and 3.72 g (15.8 mmol) 1,3,5,7-tetramethylcyclotetrasiloxane were added and continued to stir at room temperature. After reaching an equilibrium of ~87% the reaction mixture was neutralized using 127.26 g (126.0 mmol) triethylamine at room temperature. The vacuum stripping of the reaction mixture at low pressure afforded 541.4 g of the product as viscous gum. The NMR analysis of the product indicated that the polymer is a triethylammonium salt of sulfonic acid functional polydimethylsiloxane bearing pendant hydride groups.

While the invention has been described with reference to a preferable embodiment, those skilled in the art will understand that various changes may be made and equivalents may be substituted for elements thereof without departing from the scope of the invention. It is intended that the invention not be limited to the particular embodiment disclosed as the best mode for carrying out this invention, but that the invention will include all embodiments falling within the scope of the appended claims. All citations referred herein are expressly incorporated herein by reference.

What is claimed is:

1. A process for the manufacture of functional polyorganosiloxanes comprising ionic groups comprising:
    (a) conversion of a low molecular weight aralkylene modified polysiloxane to a corresponding sulfonic acid functional material by treating the low molecular weight aralkylene modified polysiloxane with a sulfonating agent to provide a first reaction product;
    (b) subjecting the first reaction product obtained in step (a) to an equilibration reaction with an acid catalyzed ring opening polymerization-effective polyorganosiloxane to provide a second reaction product wherein the second reaction product is a viscous gum or a solid; and optionally
    (c) subjecting the second reaction product obtained in step (b) to a hydrosilylation reaction with an unsaturated hydrocarbon containing at least one moiety selected from the group consisting of an epoxy group, least two unsaturation moieties, at least one sulfur heteroatom, a monovalent organosilane group, a hydroxyl containing group, a halogen, carboxylate, imine, isocyanate, amide, nitrile and tertiary amine with other than alkyl groups moiety to provide a third reaction product, and optionally,
    (d) subjecting the epoxide-containing reaction product of (c) to a ring-opening reaction with a hydroxyl, amine, acid or thiol containing hydrocarbons.

2. The process of claim 1 wherein the low molecular weight aralkylene modified polysiloxane subjected to a sulfonation reaction in step (a) is of at least one of the formulae (Ia), (Ib) or (Ic):

     (Ia)

wherein Me is $CH_3$, $R^3$ is $-CH_2-CH(R^1)(CH_2)_k C_6H_5$, or $-CH_2CH(R^1)(CH_2)_l C_6H_4(CHR^2)_k CH_3$ where $R^1$ and $R^2$ are independently hydrogen or an aliphatic, aromatic or fluoro containing monovalent hydrocarbon radical containing from 1 to about 60 carbon atoms, l has a value of about 0 to about 20 and k has a value of 0 to about 10, r is 2 or 3, s is 0 or 1, n is 1 to about 300, s+n is greater than 0, m is 0 to about 400, and the siloxy units may have a random or blockwise distribution;

     (Ib)

wherein Me and $R^3$ have the same meaning as above and p=3 to about 10; and

     (Ic)

wherein $R^3$, T and Q have the same meaning as described above.

3. The process of claim 1 wherein the sulfonating agent is selected from the group consisting of chlorosulfonic acid, sulfuric acid, liquid $SO_3$, gaseous $SO_3$, $SO_3$ containing gases, oleum, and $SO_3$ complexes or mixtures thereof.

4. The process of claim 1 wherein the reaction of step (a) is conducted at a temperature of from 0 degrees Celsius to about 180 degrees Celsius and at a pressure between 0.001 to about 100 bar.

5. The process of claim 1 wherein in the reaction of step (a) the amount of sulfonating agent is from about 0.01 to about 10.0 equivalents with respect to the arylalkylene groups present in the low molecular weight aralkylene modified polysiloxane.

6. The process of claim 1 further comprising wherein the first reaction product obtained in step (a) or the second reaction product obtained in step (b) is neutralized in the presence of a solvent at a temperature of from -25 degrees Celsius to about 180 degrees Celsius and at a pressure between 0.001 to about 100 bar.

7. The process of claim 6 wherein the solvent is a base selected from the group consisting of hydroxides, ammonia, carbonates, bicarbonates and organic amines.

8. The process of claim 7 wherein the base is a hydroxide selected from the group consisting of sodium hydroxide, potassium hydroxide, lithium hydroxide, calcium hydroxide, aluminum hydroxide and ammonium hydroxide.

9. The process of claim 7 wherein the base is a carbonate selected from the group consisting of sodium carbonate, potassium carbonate, lithium carbonate, and ammonium carbonate.

10. The process of claim 7 wherein the base is a bicarbonate selected from the group consisting of sodium bicarbonate, potassium bicarbonate, lithium bicarbonate and ammonium bicarbonate.

11. The process of claim 7 wherein the base is an organic amine selected from the group consisting of ethanolamine, diethanolamine, triethanolamine, diethyl amine, dimethyl amine, trimethyl amine, triethyl amine and tributyl amine.

12. The process of claim 1 wherein the first reaction product of step (a) has one of the general formulae (IIa) to (IIc):

$$(Me)_rR^4{}_sSiO\text{-}[MeR^4SiO]_n\text{-}[Me_2SiO]_m\text{—}Si(Me)_rR^4{}_s \quad (IIa)$$

wherein Me is $CH_3$, $R^4$ is a monovalent radical bearing ionic group and having the formula $\text{-}A\text{-}SO_3M$ where A is a divalent aralkylene group selected from the group consisting of $\text{—}(CHR')_kC_6H_4(CH_2)_l\text{—}$, $\text{—}CH_2CH(R')C_6H_4\text{—}$, and $\text{—}CH_2CH(R')(CH_2)_lC_6H_3R''\text{—}$, where R' is hydrogen or is an aliphatic, aromatic or fluoro containing monovalent hydrocarbon radical containing from 1 to about 60 carbon atoms, l is an integer having a value of 0 to 20, k is an integer having a value of 0 to 10, M is hydrogen or a cation independently selected from alkali metals, alkali earth metals, transition metals, metals, metal complexes and quaternary ammonium groups, organic cations, alkyl cations, hydrocarbon cations and cationic biopolymers, m is 0 to 400, n is 1 to about 10, r is 2 or 3, s is 0 or 1 and s+n is greater than 0; R" is a monovalent radical having from 1 to about 20 carbon atoms, sulfur atom(s), nitrogen atom(s), oxygen atom(s) or combinations thereof, and the siloxy units have a random or blockwise distribution; and, $$[MeR^4SiO]_p \quad (IIb)$$

wherein Me and $R^4$ are as defined above, and p=3 to about 10; and, $$R^4{}_sT_sQ \quad (IIc)$$

wherein $R^4$, T and Q have the same meaning as described above.

13. The process of claim 12 wherein each M is a cation independently selected from the group consisting of Li, Na, K, Cs, Mg, Ca, Ba, Zn, Cu, Fe, Ni, Ga, Al, Mn, Cr, Ag, Au, Pt, Pd, Pb, Sb, Sn, Ru, and Rh and their multivalent forms.

14. The process of claim 1 wherein the equilibration reaction of step (b) is conducted with an equilibration catalyst at a temperature of between −25 degrees Celsius to about 150 degrees Celsius and at a pressure of from about 0.001 to about 100 bar.

15. The process of claim 1 wherein the equilibration reaction of step (b) is conducted with an equilibration catalyst selected from the group consisting of sulfuric acid, sulfonic acid of the first reaction product, acid modified clay, triflic acid, potassium hydroxide, sodium hydroxide, tetramethylammonium siloxanolate and potassium siloxanolate.

16. The process of claim 1 wherein the equilibration reaction of step (b) is conducted with the reaction product of step (a) and one or more of a linear, branched or cyclic polyorganosiloxane.

17. The process of claim 12 wherein the equilibration reaction of step (b) is conducted with the first reaction product of step (a) and at least one polyorganosiloxane of the general formulae (IIIa) or (IIIb):

$$R^5R^6R^7SiO(R^8R^9SiO)_vSiR^{10}R^{11}R^{12} \quad (IIIa)$$

where $R^5$, $R^6$, $R^7$, $R^8$, $R^9$, $R^{10}$, $R^{11}$, $R^{12}$, $R^{13}$, $R^{14}$ are independently selected from hydride, methyl or a vinyl group and v=1 to about 4000;

$$(R^{13}R^{14}SiO)_w \quad (IIIb)$$

where $R^{13}$ and $R^{14}$ are as defined and w=3 to about 10.

18. The process of claim 17 wherein the polyorganosiloxane is a cyclic polyorganosiloxanes of formula (IIIb) selected from the group consisting of hexamethylcyclotrisiloxane, octamethylcyclotetrasiloxane, tetramethylcyclotetrasiloxane, decamethylcyclopentasiloxane and mixtures thereof.

19. The process of claim 17 wherein the polyorganosiloxane is a linear polyorganosiloxane of formula (IIIa) selected from the group consisting of trialkylsilyl endcapped polyorganosiloxanes or alkylhydride end-capped polyorganosiloxanes of the formula (IIIa), wherein the index "v" is 1 to about 2500.

20. The process of claim 12 wherein the equilibration reaction of step (b) is conducted with either formula (IIa) or formula (IIb) with a cyclic siloxane of the formula (IIIb):

$$(R^{13}R^{14}SiO)_w \quad (IIIb)$$

where $R^{13}$ and $R^{14}$ are independently selected from hydride, methyl or a vinyl group and w=3-10.

21. The process of claim 12 wherein the equilibration reaction of step (b) is conducted with the cyclic siloxane of formula (IIb) and with a linear siloxane of formula (IIIa):

$$R^5R^6R^7SiO(R^8R^9SiO)_vSiR^{10}R^{11}R^{12} \quad (IIIa)$$

where $R^5$, $R^6$, $R^7$, $R^8$, $R^9$, $R^{10}$, $R^{11}$, $R^{12}$, $R^{13}$, $R^{14}$ are independently selected from hydride, methyl or a vinyl group and v=1 to about 4000.

22. The process of claim 21 wherein the first reaction product of step (a) is a cyclic siloxane of formula (IIc) in a mixture with at least one trialkylsilyl-endcapped linear polydimethylsiloxane.

23. The process of claim 1 wherein the reaction product of step (b) is a silicone of the formula (A):

$$M^1{}_aM^2{}_bM^3{}_cD^1{}_dD^2{}_eD^3{}_fT^1{}_gT^2{}_hT^3{}_iQ_j \quad (A)$$

wherein:
$M^1=R^1R^2R^3SiO_{1/2}$
$M^2=R^4R^5R^6SiO_{1/2}$
$M^3=R^7R^8R^9SiO_{1/2}$
$D^1=R^{10}R^{11}SiO_{2/2}$
$D^2=R^{12}R^{13}SiO_{2/2}$
$D^3=R^{14}R^{15}SiO_{2/2}$
$T^1=R^{16}SiO_{3/2}$
$T^2=R^{17}SiO_{3/2}$
$T^3=R^{18}SiO_{3/2}$
$Q=SiO_{4/2}$ where $R^1$, $R^2$, $R^3$, $R^5$, $R^6$, $R^8$, $R^9$, $R^{10}$, $R^{11}$, $R^{13}$, $R^{15}$, $R^{16}$ are aliphatic, aromatic or fluoro containing monovalent hydrocarbon radicals containing from 1 to about 60 carbon atoms;

where $R^4$, $R^{12}$, $R^{17}$ are independently selected from a group consisting of monovalent radical bearing an ionic group and having the formula $\text{-}A\text{-}SO_3M$ where where A is a divalent arylalkylene group selected from the group consisting of divalent aralkylene group selected from the group consisting of $\text{—}(CHR')_kC_6H_4(CH_2)_l\text{—}$, $\text{—}CH_2CH(R')(CH_2)_kC_6H_4\text{—}$, and —CH$_2$CH(R')(CH$_2$)$_l$C$_6$H$_3$R''— where R' is hydrogen or an aliphatic, aromatic or fluoro containing monovalent hydrocarbon radical containing from 1 to about 60 carbon atoms, l has a value of 0 to 20, k has a value of 0 to 10, specifically from about 0 to about 5, M is hydrogen or a cation independently selected from alkali metals, alkali earth metals, transition metals, metals, metal complexes and quaternary ammonium groups, organic cations, alkyl cations, hydrocarbon cations and cationic biopolymers, m is 0 to 400, specifically from about 0 to about 10, n is 1 to 50, specifically from about 0 to about 10, r is 2 or 3, s is 0 or 1 and s+n>0;

where R' is a hydrogen or defined by R$^1$, where R'' is a monovalent radical specifically from about 1 to about 20 carbon atoms, sulfur atom(s), nitrogen atom(s), oxygen atom(s) or a radical containing combinations of the above atoms, where M is hydrogen or a cation independently selected from alkali metals, alkali earth metals, transition metals, metals, metal complexes, quaternary ammonium and phosphonium groups, organic cations, alkyl cations, hydrocarbon cations and cationic biopolymers;

R$^7$, R$^{14}$, R$^{18}$ are independently selected from hydrogen or vinyl groups, and where the subscript a, b, c, d, e, f, g, h, i, j are zero or positive subject to the following limitations: the sum a+b+c+d+e+f+g+h+i+j is greater than or equal to 2 and less than or equal to 6000, b+e+h is greater than zero and c+f+i is greater than or equal to zero.

24. The process of claim 1 wherein following the equilibration reaction of step (b) the catalyst is deactivated.

25. The process of claim 1 including the step
(c) subjecting the second reaction product obtained in step (b) to a hydrosilylation
reaction with an unsaturated hydrocarbon containing at least one moiety selected from the group consisting of an epoxy group, least two unsaturation moieties, at least one sulfur heteroatom, a monovalent organosilane group, a hydroxyl containing group, a halogen, carboxylate, imine, isocyanate, amide, nitrile and tertiary amine with other than alkyl groups moiety to provide a third reaction product.

26. The process of claim 25 wherein the hydrosilylation reaction of step (c) is conducted in the presence of a hydrosilylation catalyst selected from the group consisting of transition metals selected from platinum, rhodium, iridium, palladium, nickel, osmium, iron, cobalt, tin, zirconium, titanium, hafnium, and ruthenium, manganese, copper, silver, gold, chromium, rhenium, calcium, strontium, potassium, their various ligands, complexes, precatalysts, or mixtures thereof; Lewis acids such as TiCl$_4$, EtAlCl$_2$, AlCl$_3$ and AlBr$_3$ and mixtures thereof, or transition metal compounds or mixtures thereof.

27. The process of claim 26 wherein the metal of the catalyst is in the range of 1 to about 1000 ppm relative to the weight of the silylhydride containing siloxane which is present in the reaction product of step (b).

28. The process of claim 25 wherein the unsaturated hydrocarbons in step (c) have one of the general formulae (IV to XIII):

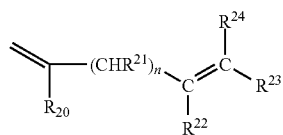
(IV)

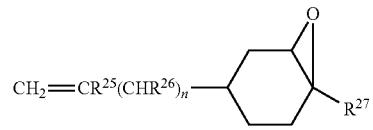
(V)

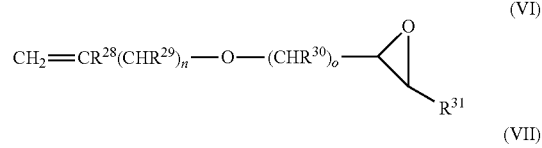
(VI)

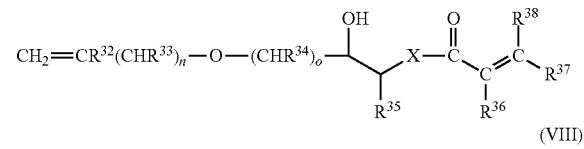
(VII)

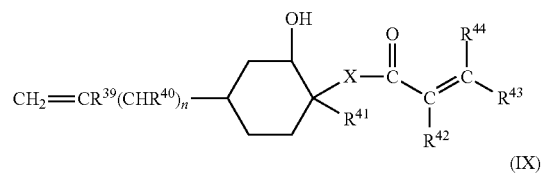
(VIII)

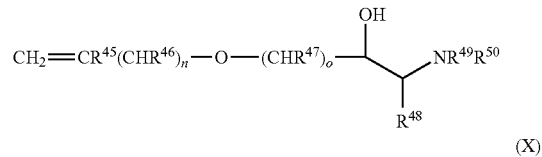
(IX)

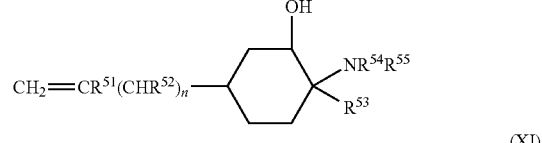
(X)

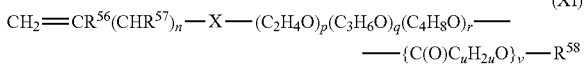
(XI)

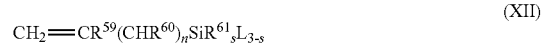
(XII)

(XIII)

where R$^{20}$, R$^{21}$, R$^{26}$, R$^{29}$, R$^{30}$, R$^{33}$, R$^{34}$, R$^{40}$, R$^{46}$, R$^{47}$, R$^{52}$, R$^{63}$ are independently selected from —H, —OH, —R$^{66}$ and aliphatic/aromatic monovalent hydrocarbon having from 1 to about 60 carbon atoms, where R$^{22}$, R$^{23}$, R$^{24}$, R$^{25}$, R$^{27}$, R$^{28}$, R$^{31}$, R$^{32}$, R$^{35}$, R$^{36}$, R$^{37}$, R$^{38}$, R$^{39}$, R$^{41}$, R$^{42}$, R$^{43}$, R$^{44}$, R$^{45}$, R$^{48}$, R$^{51}$, R$^{53}$, R$^{56}$, R$^{57}$, R$^{59}$, R$^{60}$, R$^{61}$, R$^{62}$ are independently selected from hydrogen, aliphatic/aromatic monovalent hydrocarbon having from 1 to 60 carbon atoms, where R$^{58}$ is hydrogen or a monovalent alkyl radical with 2 to about 20 carbon atoms or or a heteroatom where R$^{49}$, R$^{50}$, R$^{54}$, R$^{55}$ are independently selected from —H, —C$_t$H$_{2t}$OH and aliphatic/aromatic monovalent hydrocarbon having from 1 to 60 carbon atoms wherein t is a positive integer, where L is a monovalent radical independently selected from halogen, OR$^{64}$, —CO(O)R$^{65}$, —N═CR$^{66}$$_2$, —NCO, —NC(O)R$^{67}$, —C≡N, —N≡N and —NR$^{68}$$_2$ where R$^{64}$, R$^{65}$, R$^{66}$, R$^{67}$, R$^{68}$ are independently selected from a group consisting of hydrogen, alkyl, alkenyl, cycloalkyl and aryl, where Z is a monovalent radical independently selected from halogen, $OR^{64A}$, $-CO(O)R^{65}$, $-N=CR^{66}_2$, $-NCO$, $-NC(O)R^{67}$, $-C\equiv N$, $-N\equiv N$ and $-NR^{68A}_2$ where $R^{65}$, $R^{66}$, $R^{67}$, are independently selected from a group consisting of hydrogen, alkyl, alkenyl, cycloalkyl and aryl, and where $R^{64A}$ is hydrogen or independently selected from a group consisting of alkyl, alkenyl, cycloalkyl and aryl containing from 2 to about 60 carbon atoms, and where $R^{68A}$ is independently selected from a group consisting of hydrogen, alkenyl, cycloalkyl and aryl containing from 2 to about 60 carbon atoms, where X is divalent radical selected from $-CHR^{65}-$, $-O-$, $-NR^{65}-$ and $-S-$ linkages, where B is a divalent radical selected from a linear, branched, cyclic hydrocarbon radical or aralkyl radical of from 1 to about 60 carbon atoms and may contain a heteroatom;

where the subscript n is zero or positive integer and has a value in the range of 0 to 60, where subscript o is positive integer and has a value in the range of 1 to about 60, where subscripts p, q, r, u and v are zero or positive and independently selected from a value in the range of 0 to about 100, subject to the limitation of p+q+r+v being greater than or equal to 1 and s is zero or a positive integer and has a value of 0 to 2.

29. The process of claim 25 wherein the epoxide-containing third reaction product of step (c) is subjected to a ring-opening reaction in presence of a suitable catalyst with a hydroxyl, amine, carboxylic acid and thiol containing hydrocarbons, azide containing molecule or water.

30. The method of claim 25 wherein the third reaction product contains an epoxide and the method further includes step (d) subjecting the epoxide-containing third reaction product of step (c) to a ring-opening reaction with a hydroxyl, amine, acid or thiol containing hydrocarbon.

31. The process of claim 30 wherein the epoxide-containing product used in the step (d) has the general formula (A) where $R^7$, $R^{14}$ and $R^{18}$ are monovalent hydrocarbon radical selected from the group of formula XIII and XIV:

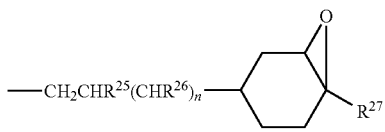
(XIV)

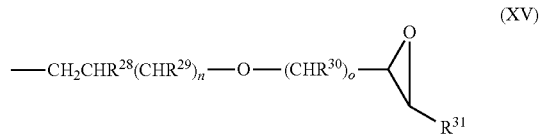
(XV)

(XV) where $R^{25}$, $R^{26}$, $R^{27}$, $R^{28}$, $R^{29}$, $R^{30}$ and $R^{31}$ are defined above.

32. The process of claim 30 wherein the hydroxyl containing hydrocarbon is used in step (d) and is selected from the group consisting of aliphatic or aromatic alcohol containing 1 to 60 carbon atoms.

33. The process of claim 30 wherein the amine containing hydrocarbon is used in step (d) and is selected from the group consisting of aliphatic or aromatic amine containing 1 to 60 carbon atoms.

34. The process of claim 30 wherein the carboxylic acid containing hydrocarbon is used in step (d) and is selected from the group consisting of aliphatic or aromatic carboxylic acid containing 1 to 60 carbon atoms.

35. The process of claim 30 wherein thiol containing hydrocarbon is used in step (d) and is selected from the group consisting of the aliphatic or aromatic alcohol containing 1 to 60 carbon atoms.

36. The process of claim 29 wherein the azide containing molecule is selected from the group consisting of sodium azide, calcium azide, potassium azide, lithium azide and trimethylsilyl azide.

37. The process of claim 31 wherein a catalyst is used in step (d) which comprises one or more of organometallic compounds selected from the group consisting of organo tin, titanium, zinc and calcium compounds, or Lewis acids, Broensted acids or bases with low vapour pressure, $C_1$-$C_8$ carbonacids or alkylamines.

38. The process of claim 30 wherein the reaction of step (d) is done in the presence of a solvent selected from the group consisting of aliphatic alcohols, glycol ethers, cycloaliphatic alcohols, aliphatic esters, cycloaliphatic esters, aliphatic hydrocarbons, cycloaliphatic hydrocarbons, aromatic hydrocarbons, halogenated aliphatic compounds, halogenated cycloaliphatic compounds, halogenated aromatic compounds, aliphatic ethers, cycloaliphatic ethers, amide solvents, and sulfoxide solvents.

* * * * *